US009111118B2

(12) United States Patent
DeHaan

(10) Patent No.: US 9,111,118 B2
(45) Date of Patent: Aug. 18, 2015

(54) MANAGING ACCESS IN A SOFTWARE PROVISIONING ENVIRONMENT

(75) Inventor: Michael Paul DeHaan, Morrisville, NC (US)

(73) Assignee: Red Hat, Inc., Raleigh, NC (US)

( * ) Notice: Subject to any disclaimer, the term of this patent is extended or adjusted under 35 U.S.C. 154(b) by 1380 days.

(21) Appl. No.: 12/201,832

(22) Filed: Aug. 29, 2008

(65) Prior Publication Data

US 2010/0058444 A1 Mar. 4, 2010

(51) Int. Cl.
  G06F 7/04 (2006.01)
  G06F 11/00 (2006.01)
  G06F 21/62 (2013.01)
  H04L 29/06 (2006.01)

(52) U.S. Cl.
  CPC .......... *G06F 21/629* (2013.01); *H04L 63/102* (2013.01)

(58) Field of Classification Search
  CPC ........................................... G06F 8/60
  USPC .................. 726/4, 27–28; 717/168–178; 709/220–222
  See application file for complete search history.

(56) References Cited

U.S. PATENT DOCUMENTS

| | | | |
|---|---|---|---|
| 5,787,246 A | 7/1998 | Lichtman et al. | |
| 5,835,719 A | 11/1998 | Gibson et al. | |
| 5,948,062 A | 9/1999 | Tzelnic et al. | |
| 6,105,100 A | 8/2000 | Dean et al. | |
| 6,212,585 B1 | 4/2001 | Chrabaszcz | |
| 6,243,747 B1 | 6/2001 | Lewis et al. | |
| 6,243,755 B1 * | 6/2001 | Takagi et al. | 709/229 |
| 6,272,536 B1 | 8/2001 | van Hoff et al. | |
| 6,381,742 B2 | 4/2002 | Forbes et al. | |
| 6,415,289 B1 | 7/2002 | Williams et al. | |
| 6,438,711 B2 | 8/2002 | Woodruff | |
| 6,516,427 B1 | 2/2003 | Keyes et al. | |
| 6,526,442 B1 | 2/2003 | Stupek, Jr. et al. | |
| 6,550,021 B1 | 4/2003 | Dalphy et al. | |
| 6,557,169 B1 | 4/2003 | Erpeldinger | |
| 6,594,664 B1 | 7/2003 | Estrada et al. | |
| 6,625,742 B1 | 9/2003 | Owhadi et al. | |
| 6,686,838 B1 | 2/2004 | Rezvani et al. | |
| 6,751,659 B1 | 6/2004 | Fenger et al. | |
| 6,757,837 B1 | 6/2004 | Platt et al. | |
| 6,769,022 B1 | 7/2004 | DeKoning et al. | |
| 6,779,004 B1 | 8/2004 | Zintel | |
| 6,845,464 B2 | 1/2005 | Gold | |

(Continued)

OTHER PUBLICATIONS

DeHaan, "Systems and Methods for Message-Based Installation Management Using Message Bus", U.S. Appl. No. 12/495,077, filed Jun. 30, 2009.

(Continued)

*Primary Examiner* — Abu Sholeman
(74) *Attorney, Agent, or Firm* — Lowenstein Sandler LLP

(57) ABSTRACT

A provisioning server can be configured to associate user actions with users that have access to perform the associated user actions. The user actions can include any user action performed within or by the provisioning server, such as configuring the provisioning server, modifying provisioning objects in the provisioning server, accessing provisioning processes by the provisioning server, and the like. The association can be based on the identity of the users or a type of user (administrator, client, guest, etc.). Once a request is received for a particular user action, the provisioning server can be configured to enable the requested action if the requested action is associated with the requesting user.

12 Claims, 4 Drawing Sheets

(56) References Cited

U.S. PATENT DOCUMENTS

| | | | |
|---|---|---|---|
| 6,865,737 B1 | 3/2005 | Lucas et al. | |
| 6,947,939 B2 | 9/2005 | Fujibayashi et al. | |
| 6,986,033 B2 | 1/2006 | Miyamoto et al. | |
| 7,013,461 B2 | 3/2006 | Hellerstein et al. | |
| 7,051,101 B1 | 5/2006 | Dubrovsky et al. | |
| 7,089,297 B1* | 8/2006 | Salas et al. | 709/220 |
| 7,107,330 B1 | 9/2006 | Hamilton, II et al. | |
| 7,133,822 B1 | 11/2006 | Jacobson | |
| 7,165,109 B2 | 1/2007 | Chiloyan et al. | |
| 7,185,071 B2 | 2/2007 | Berg et al. | |
| 7,200,845 B2 | 4/2007 | Morrison et al. | |
| 7,222,165 B1* | 5/2007 | Ellis et al. | 709/223 |
| 7,293,070 B2* | 11/2007 | Moses et al. | 709/217 |
| 7,340,637 B2 | 3/2008 | Nagoya | |
| 7,350,112 B2 | 3/2008 | Fox et al. | |
| 7,350,237 B2* | 3/2008 | Vogel et al. | 726/27 |
| 7,356,679 B1 | 4/2008 | Le et al. | |
| 7,395,322 B2 | 7/2008 | Harvey et al. | |
| 7,506,040 B1 | 3/2009 | Rabe et al. | |
| 7,506,151 B2 | 3/2009 | Miyamoto et al. | |
| 7,516,218 B2 | 4/2009 | Besson | |
| 7,519,691 B2 | 4/2009 | Nichols et al. | |
| 7,574,481 B2 | 8/2009 | Moore et al. | |
| 7,600,005 B2 | 10/2009 | Jamkhedkar et al. | |
| 7,606,868 B1 | 10/2009 | Le et al. | |
| 7,640,325 B1 | 12/2009 | DeKoning et al. | |
| 7,657,887 B2* | 2/2010 | Kothandaraman et al. | 717/176 |
| 7,681,080 B2 | 3/2010 | Abali et al. | |
| 7,702,758 B2* | 4/2010 | Shrivastava et al. | 709/220 |
| 7,716,316 B2 | 5/2010 | Nichols et al. | |
| 7,734,717 B2 | 6/2010 | Saarimäki et al. | |
| 7,827,261 B1 | 11/2010 | Griswold, Jr. et al. | |
| 7,831,997 B2 | 11/2010 | Eldar et al. | |
| 7,937,437 B2 | 5/2011 | Fujii | |
| 2002/0019936 A1* | 2/2002 | Hitz et al. | 713/165 |
| 2002/0062259 A1 | 5/2002 | Katz et al. | |
| 2002/0078186 A1 | 6/2002 | Engel et al. | |
| 2002/0138567 A1 | 9/2002 | Ogawa | |
| 2002/0162028 A1 | 10/2002 | Kennedy | |
| 2003/0005097 A1 | 1/2003 | Barnard et al. | |
| 2003/0055919 A1 | 3/2003 | Fong et al. | |
| 2003/0069884 A1 | 4/2003 | Nair et al. | |
| 2003/0069946 A1 | 4/2003 | Nair et al. | |
| 2003/0070110 A1 | 4/2003 | Aija et al. | |
| 2003/0074549 A1 | 4/2003 | Paul et al. | |
| 2003/0110173 A1 | 6/2003 | Marsland | |
| 2003/0119480 A1 | 6/2003 | Mohammed | |
| 2003/0126585 A1 | 7/2003 | Parry | |
| 2003/0195921 A1 | 10/2003 | Becker et al. | |
| 2003/0212992 A1 | 11/2003 | Ronning et al. | |
| 2004/0006616 A1 | 1/2004 | Quinn et al. | |
| 2004/0015831 A1 | 1/2004 | Bowhill | |
| 2004/0015957 A1 | 1/2004 | Zara et al. | |
| 2004/0019876 A1 | 1/2004 | Dravida et al. | |
| 2004/0024984 A1 | 2/2004 | Lanzatella et al. | |
| 2004/0044643 A1 | 3/2004 | deVries et al. | |
| 2004/0054789 A1 | 3/2004 | Breh et al. | |
| 2004/0059703 A1 | 3/2004 | Chappell et al. | |
| 2004/0064501 A1 | 4/2004 | Jan et al. | |
| 2004/0128375 A1 | 7/2004 | Rockwell | |
| 2004/0143664 A1 | 7/2004 | Usa et al. | |
| 2004/0167975 A1 | 8/2004 | Hwang et al. | |
| 2004/0215755 A1 | 10/2004 | O'Neill | |
| 2004/0223469 A1 | 11/2004 | Bahl et al. | |
| 2005/0028025 A1 | 2/2005 | Zalewski et al. | |
| 2005/0050175 A1 | 3/2005 | Fong et al. | |
| 2005/0075918 A1* | 4/2005 | Yanagimachi | 705/8 |
| 2005/0080801 A1* | 4/2005 | Kothandaraman et al. | 707/100 |
| 2005/0083846 A1* | 4/2005 | Bahl | 370/236 |
| 2005/0114474 A1 | 5/2005 | Anderson et al. | |
| 2005/0125525 A1 | 6/2005 | Zhou et al. | |
| 2005/0132220 A1* | 6/2005 | Chang et al. | 713/201 |
| 2005/0177829 A1 | 8/2005 | Vishwanath | |
| 2005/0182796 A1 | 8/2005 | Chu et al. | |
| 2005/0198534 A1* | 9/2005 | Matta et al. | 713/201 |
| 2005/0198629 A1 | 9/2005 | Vishwanath | |
| 2005/0223374 A1 | 10/2005 | Wishart et al. | |
| 2006/0041767 A1 | 2/2006 | Maxwell et al. | |
| 2006/0075141 A1* | 4/2006 | Boxenhorn | 709/246 |
| 2006/0080659 A1 | 4/2006 | Ganji | |
| 2006/0095230 A1 | 5/2006 | Grier et al. | |
| 2006/0095702 A1 | 5/2006 | Hickman et al. | |
| 2006/0155857 A1 | 7/2006 | Feenan et al. | |
| 2006/0173912 A1 | 8/2006 | Lindvall et al. | |
| 2006/0174018 A1 | 8/2006 | Zhu et al. | |
| 2006/0190575 A1 | 8/2006 | Harvey et al. | |
| 2006/0190773 A1 | 8/2006 | Rao et al. | |
| 2006/0200658 A1 | 9/2006 | Penkethman | |
| 2006/0215575 A1 | 9/2006 | Horton et al. | |
| 2006/0218544 A1 | 9/2006 | Chakraborty et al. | |
| 2006/0230165 A1 | 10/2006 | Zimmer et al. | |
| 2006/0230281 A1* | 10/2006 | Hofmann | 713/182 |
| 2006/0282479 A1 | 12/2006 | Johnson et al. | |
| 2007/0015538 A1 | 1/2007 | Wang | |
| 2007/0067419 A1 | 3/2007 | Bennett | |
| 2007/0101118 A1 | 5/2007 | Raghunath et al. | |
| 2007/0118654 A1 | 5/2007 | Jamkhedkar et al. | |
| 2007/0168721 A1 | 7/2007 | Luiro et al. | |
| 2007/0169093 A1 | 7/2007 | Logan et al. | |
| 2007/0192158 A1 | 8/2007 | Kim | |
| 2007/0204338 A1 | 8/2007 | Aiello et al. | |
| 2007/0226810 A1 | 9/2007 | Hotti | |
| 2007/0244996 A1 | 10/2007 | Ahmed et al. | |
| 2007/0276905 A1 | 11/2007 | Durand et al. | |
| 2007/0288612 A1 | 12/2007 | Hall | |
| 2007/0294376 A1 | 12/2007 | Ayachitula et al. | |
| 2007/0299951 A1 | 12/2007 | Krithivas | |
| 2008/0028048 A1 | 1/2008 | Shekar Cs et al. | |
| 2008/0040452 A1 | 2/2008 | Rao et al. | |
| 2008/0046708 A1 | 2/2008 | Fitzgerald et al. | |
| 2008/0052765 A1* | 2/2008 | Shinomiya et al. | 726/3 |
| 2008/0059959 A1 | 3/2008 | Chen et al. | |
| 2008/0072334 A1* | 3/2008 | Bailey et al. | 726/28 |
| 2008/0091774 A1* | 4/2008 | Taylor et al. | 709/203 |
| 2008/0109897 A1* | 5/2008 | Moran et al. | 726/19 |
| 2008/0130639 A1 | 6/2008 | Costa-Requena et al. | |
| 2008/0189693 A1 | 8/2008 | Pathak | |
| 2008/0189768 A1* | 8/2008 | Callahan et al. | 726/4 |
| 2008/0196043 A1 | 8/2008 | Feinleib et al. | |
| 2008/0235266 A1 | 9/2008 | Huang et al. | |
| 2008/0235361 A1 | 9/2008 | Crosbie et al. | |
| 2008/0244325 A1 | 10/2008 | Tyulenev | |
| 2008/0270674 A1 | 10/2008 | Ginzton | |
| 2008/0294777 A1 | 11/2008 | Karve et al. | |
| 2008/0301666 A1 | 12/2008 | Gordon et al. | |
| 2008/0313716 A1* | 12/2008 | Park | 726/4 |
| 2008/0320110 A1 | 12/2008 | Pathak | |
| 2009/0006415 A1* | 1/2009 | McAniff et al. | 707/10 |
| 2009/0007091 A1 | 1/2009 | Appiah et al. | |
| 2009/0055901 A1* | 2/2009 | Kumar et al. | 726/4 |
| 2009/0064132 A1 | 3/2009 | Suchy et al. | |
| 2009/0077639 A1* | 3/2009 | Williams et al. | 726/5 |
| 2009/0077657 A1* | 3/2009 | Williams et al. | 726/21 |
| 2009/0089567 A1 | 4/2009 | Boland, IV et al. | |
| 2009/0089852 A1 | 4/2009 | Randolph et al. | |
| 2009/0106291 A1 | 4/2009 | Ku et al. | |
| 2009/0119062 A1* | 5/2009 | Owens et al. | 702/176 |
| 2009/0129597 A1 | 5/2009 | Zimmer et al. | |
| 2009/0132682 A1 | 5/2009 | Counterman | |
| 2009/0132710 A1 | 5/2009 | Pelley | |
| 2009/0133006 A1* | 5/2009 | Cheung | 717/144 |
| 2009/0158148 A1 | 6/2009 | Vellanki et al. | |
| 2009/0158272 A1* | 6/2009 | El-Assir et al. | 717/177 |
| 2009/0164522 A1 | 6/2009 | Fahey | |
| 2009/0165099 A1 | 6/2009 | Eldar et al. | |
| 2009/0172430 A1 | 7/2009 | Takenouchi | |
| 2009/0240835 A1 | 9/2009 | Adelman et al. | |
| 2009/0249436 A1* | 10/2009 | Coles et al. | 726/1 |
| 2009/0259665 A1 | 10/2009 | Howe et al. | |
| 2009/0265707 A1 | 10/2009 | Goodman et al. | |
| 2009/0282404 A1 | 11/2009 | Khandekar et al. | |
| 2009/0285199 A1 | 11/2009 | Strahs et al. | |
| 2010/0023740 A1 | 1/2010 | Moon et al. | |
| 2010/0057930 A1* | 3/2010 | DeHaan | 709/232 |

(56) References Cited

U.S. PATENT DOCUMENTS

| | | | |
|---|---|---|---|
| 2010/0058327 A1* | 3/2010 | Dehaan | 717/176 |
| 2010/0058444 A1* | 3/2010 | DeHaan | 726/4 |
| 2010/0082799 A1* | 4/2010 | DeHaan et al. | 709/224 |
| 2010/0083245 A1* | 4/2010 | DeHaan et al. | 717/177 |
| 2010/0100876 A1 | 4/2010 | Glover et al. | |
| 2010/0115594 A1* | 5/2010 | Paya et al. | 726/5 |
| 2010/0131648 A1* | 5/2010 | Dehaan | 709/226 |
| 2010/0217837 A1 | 8/2010 | Ansari et al. | |
| 2010/0220584 A1 | 9/2010 | DeHaan et al. | |
| 2010/0223504 A1 | 9/2010 | DeHaan et al. | |
| 2010/0223608 A1 | 9/2010 | DeHaan et al. | |
| 2010/0223609 A1 | 9/2010 | DeHaan et al. | |
| 2010/0269170 A1* | 10/2010 | Chauhan et al. | 726/12 |
| 2011/0126276 A1* | 5/2011 | Dykeman et al. | 726/12 |

OTHER PUBLICATIONS

Henson, "Systems and Methods for Integrating Storage Resources from Storage Area Network in Machine Provisioning Platform", U.S. Appl. No. 12/628,041, filed Nov. 30, 2009.

Henson, "Systems and Methods for Mounting Specified Storage Resources from Storage Area Network in Machine Provisioning Platform", U.S. Appl. No. 12/627,988, filed Nov. 30, 2009.

DeHaan, "Systems and Methods for Providing Configuration Management Services from a Provisioning Server", U.S. Appl. No. 12/414,941, filed Mar. 31, 2009.

DeHaan, "Systems and Methods for Retiring Target Machines by a Provisioning Server", U.S. Appl. No. 12/475,427, filed May 29, 2009.

DeHaan, "Methods and Systems for Centrally Managing Multiple Provisioning Servers", U.S. Appl. No. 12/201,193, filed Aug. 29, 2008.

DeHaan, "Methods and Systems for Assigning Provisioning Servers in a Software Provisioning Environment", U.S. Appl. No. 12/201,646, filed Aug. 29, 2008.

DeHaan, "Methods and Systems for Providing Remote Software Provisioning to Machines", U.S. Appl. No. 121195,633, filed Aug. 21, 2008.

DeHaan, "Systems and Methods for Storage Allocation in Provisioning of Virtual Machines", U.S. Appl. No. 12/202,178, filed Aug. 29, 2008.

DeHaan, "Methods and Systems for Providing Customized Actions Related to Software Provisioning", U.S. Appl. No. 12/200,552, filed Aug. 28, 2008.

DeHaan, "Methods and Systems for Automatically Locating a Provisioning Server", U.S. Appl. No. 12/198,290, filed Aug. 26, 2008.

DeHaan, "Methods and Systems for Importing Software Distributions in a Software Provisioning Environment", U.S. Appl. No. 12/200,631, filed Aug. 28, 2008.

DeHaan et al., "Methods and Systems for Managing Network Connections Associated with Provisioning Objects in a Software Provisioning Environment", U.S. Appl. No. 12/239,690, filed Sep. 26, 2008.

DeHaan, "Methods and Systems for Monitoring Software Provisioning", U.S. Appl. No. 12/198,378, filed Aug. 26, 2008.

DeHaan, "Systems and Methods for Software Provisioning in Multiple Network Configuration Environment", U.S. Appl. No. 12/202,194, filed Aug. 29, 2008.

DeHaan, "Systems and Methods for Differential Software Provisioning on Virtual Machines Having Different Configurations", U.S. Appl. No. 12/202,019, filed Aug. 29, 2008.

DeHaan, "Methods and Systems for Automatically Registering New Machines in a Software Provisioning Environment", U.S. Appl. No. 12/194,754, filed Aug. 20, 2008.

DeHaan, "Systems and Methods for Software Provisioning Machines Having Virtual Storage Resources", U.S. Appl. No. 12/202,189, filed Aug. 29, 2008.

DeHaan et al., "Methods and Systems for Managing Network Connections in a Software Provisioning Environment", U.S. Appl. No. 12/239,681, filed Sep. 26, 2008.

DeHaan et al., "Methods and Systems for Providing a Rescue Environment in a Software Provisioning Environment", U.S. Appl. No. 12/325,007, filed Nov. 28, 2008.

DeHaan et al., "Systems and Methods for Monitoring Hardware Resources in a Software Provisioning Environment", U.S. Appl. No. 12/325,056, filed Nov. 28, 2008.

DeHaan, "Methods and Systems for Providing Power Management Services in a Software Provisioning Environment", U.S. Appl. No. 12/277,518, filed Nov. 25, 2008.

DeHaan et al., "Methods and Systems for Providing Hardware Updates in a Software Provisioning Environment", U.S. Appl. No. 12/324,991, filed Nov. 28, 2008.

DeHaan et al., "Methods and Systems for Supporting Multiple Name Servers in a Software Provisioning Environment", U.S. Appl. No. 12/324,572, filed Nov. 26, 2008.

DeHaan et al., "Methods and Systems for Secure Gated File Deployment Associated with Provisioning", U.S. Appl. No. 12/393,754, filed Feb. 26, 2009.

DeHaan, "Systems and Methods for Integrating Software Provisioning and Configuration Management", U.S. Appl. No. 12/395,379, filed Feb. 27, 2009.

DeHaan, "Systems and Methods for Abstracting Software Content Management in a Software Provisioning Environment", U.S. Appl. No. 12/395,273, filed Feb. 27, 2009.

DeHaan et al., "Systems and Methods for Providing a Library of Virtual Images in a Software Provisioning Environment", U.S. Appl. No. 12/395,351, filed Feb. 27, 2009.

DeHaan et al., "Systems and Methods for Inventorying Un-Provisioned Systems in a Software Provisioning Environment", U.S. Appl. No. 12/391,588, filed Feb. 24, 2009.

DeHaan et al., "Systems and Methods for Managing Configurations of Storage Devices in a Software Provisioning Environment", U.S. Appl. No. 12/393,613, filed Feb. 26, 2009.

DeHaan et al., "Systems and Methods for Collecting and Altering Firmware Configurations of Target Machines in a Software Provisioning Environment", U.S. Appl. No. 12/393,319, filed Feb. 26, 2009.

DeHaan et al., "Methods and Systems for Replicating Provisioning Servers in a Software Provisioning Environment", U.S. Appl. No. 12/392,508, filed Feb. 25, 2009.

DeHaan, "Systems and Methods for Cloning Target Machines in a Software Provisioning Environment", U.S. Appl. No. 12/473,014, filed May 27, 2009.

Doc Searls "Linux for Suits", 2005, Specialized System Consultants Inc., vol. 2005.

Grosse, "Repository Mirroring", 1995.

Butt et al., "Automated Installation of Large-Scale Linux Networks", 2000.

Agarwalla, "Automating Provisioning of Complete Software Stack in a Grid Environment", 2004.

Anderson et al., "Technologies for Large-Scale Configuration Management", Dec. 9, 2002.

eBook "Microsoft System Management Server 2003 Administrator's companion", Microsoft Press, c2004, Ch. 13, Patch Management, pp. 471-507.

HP Storage Essentials SRM 6.0 Installation Guide. Jan. 2008. HP. 1st ed. Part No. T4283-96113. pp. 1-5, 97-136, 219-228.

HP Storage Essential SRM 6.0 User Guide. Jan. 2008. HP. 1st ed. Part No. T4238-96114. pp. 1-83.

Michael DeHaan. "Unfiled Provisioning". 2007.

Michael DeHaan. "Provisioning With Cobbler". 2007.

Tan et al. "A WBEM Basked Disk Array Management Provider". 2005. IEEE. 2005 International Conference on Cyberwortds.

Lovelace et al. Managing Disk Subsystems using IBM TotalStorage Productivity Cetter. Sep. 2005. IBM. 2nd ed. SG24-7097-01. pp. 1-42.

Michael DeHaan, "Methods and Systems for Provisioning Software", U.S. Appl. No. 11/763,315, filed Jun. 14, 2007.

Michael DeHaan, "Methods and Systems for Provisioning Software", U.S. Appl. No. 11/763,333, filed Jun. 14, 2007.

* cited by examiner

MANAGING ACCESS IN A SOFTWARE PROVISIONING ENVIRONMENT

FIELD

This invention relates generally to software provisioning.

DESCRIPTION OF THE RELATED ART

Software provisioning is the process of selecting a target machine, such as a server, loading the appropriate software (operating system, device drivers, middleware, and applications), and customizing and configuring the system and the software to make it ready for operation. Software provisioning can entail a variety of tasks, such as creating or changing a boot image, specifying parameters, e.g. IP address, IP gateway, to find associated network and storage resources, and then starting the machine and its newly-loaded software. Typically, a system administrator will perform these tasks using various tools because of the complexity of these tasks. Unfortunately, there is a lack of provisioning control tools that can adequately integrate and automate these tasks.

Typically, software provisioning is performed on target machines regardless of the user requesting the software provisioning. A user can request software provisioning on different target machines, and the software provisioning environment has no mechanism to determine whether the user should be granted the provisioning services. As such, the software provisioning environment cannot authenticate the users requests. Additionally, because the software provisioning environment cannot discriminate particular users, different levels of access cannot be provided by the software provisioning environment.

Additionally, the software provisioning environment should allow users to administer machines that they control, but not allow them access to reinstall or manage machines they do not have access to. For instance, a lab administrator should have access to control installation of machines in his lab, but not outside of his network, while a site administrator should be able to more widely access provisioning settings. Similarly, there may be different levels of administrators administering a network. One administrator may need access to be able to reinstall hardware but not have access to change the definitions of what is being installed. Conventional provisioning environments, however, do not allow for levels of access or control to handle these situations. Accordingly, it would be desirable to provide a provisioning environment in which users can be assigned access levels and software provisioning actions can be provided based on the access levels.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
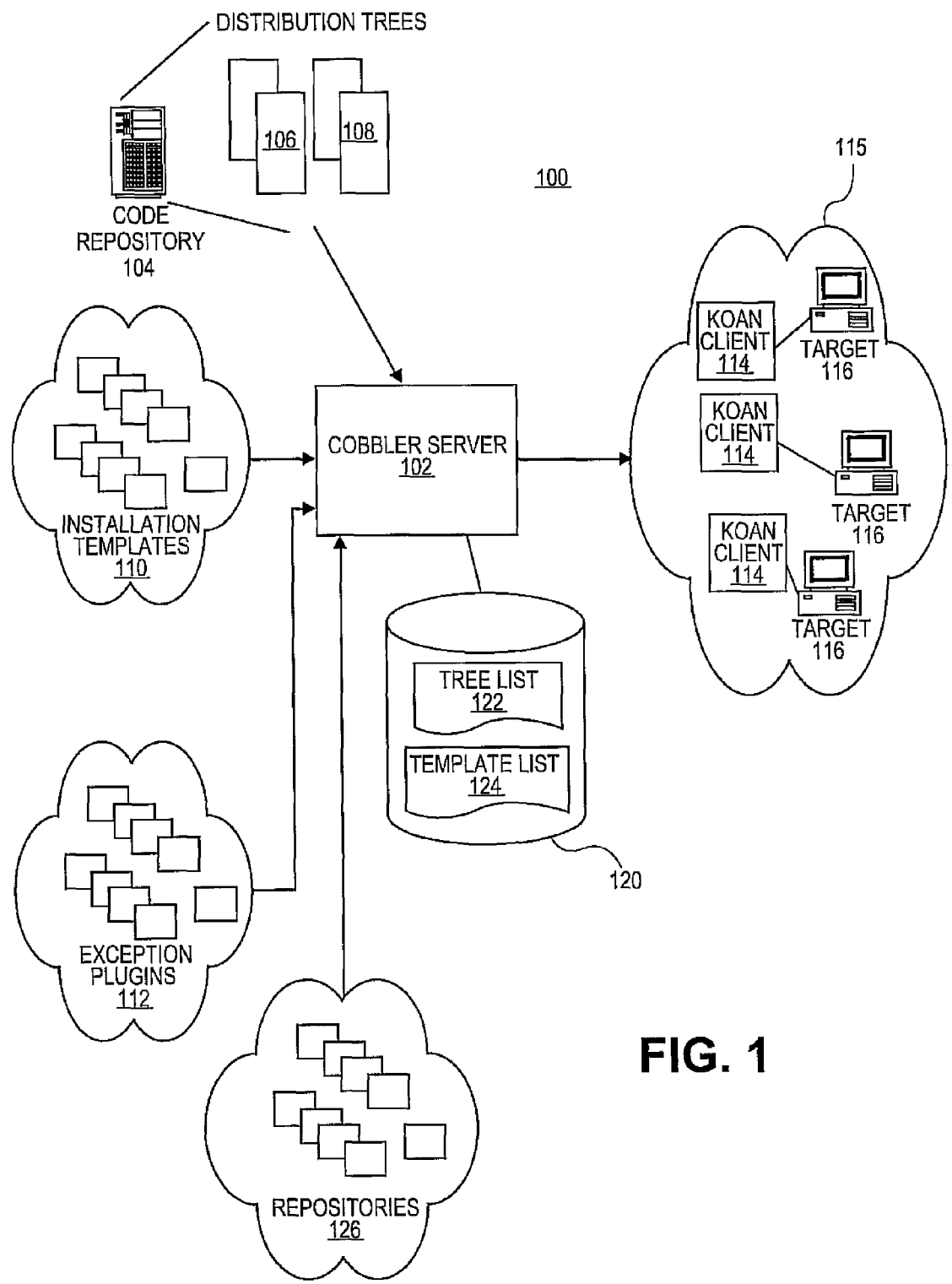
FIG. 1 illustrates an overall provisioning environment in which various embodiments of the present teachings can be practiced.

For simplicity and illustrative purposes, the principles of the present invention are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present teachings relate to systems and methods for providing access in a software provisioning environment. More particularly, a provisioning server can assign different access levels to users in the software provisioning environment and provide access to the environment based on the access levels.

In embodiments, to provide access in the provisioning environment, a provisioning server can be configured to associate user actions with users that have access to perform the associated user actions. The user actions can include any user action performed within or by the provisioning server, such as configuring the provisioning server, modifying provisioning objects in the provisioning server, accessing provisioning processes by the provisioning server, and the like.

In embodiments, the provisioning server can be configured to include an access module. The access module can be configured to assign different levels of access to users in the software provisioning environment. In particular, the access module can be configured to associate the users with the user actions available to the users. The association can be based on the identity of the users or a type of user (administrator, client, guest, etc.).

In embodiments, once a request is received for a particular user action, the provisioning server can be configured to enable the requested action if the requested action is associated with the requesting user. In particular, the provisioning server can be configured to verify that the requesting user has access to the particular user action. The access module can be configured to perform the verification. Likewise, the verification can be performed by an external source and the provisioning server can be configured to receive a verification message.

In embodiments, the provisioning server can be configured to maintain user records for each user that can request user actions in the software environment. The user records can include identity information for each user associated with the user actions available to the user. Additionally, the user records can be maintain by the external source.

In embodiments, the provisioning server can be configured to authenticate the identity of the requesting user. In particular, the access module can be configured to authenticate the user identity to ensure that the requesting user is authentic. Additionally, the authentication of identity can be performed by the external source and the provisioning server can be configured to receive an authentication message.

In embodiments, to provide access, the provisioning server can be configured to provide a network user interface to the user. The network interface can be configured to allow the user enter identity and authentication information, and request user actions.

By providing access controls, the provisioning server can allow a user to be assigned different access levels. As such, the provisioning server can provide different levels of software provisioning processes to different users. Additionally by providing access controls, the provisioning server can maintain security and integrity in the software provisioning environment and provide ownership to different actions in the software provisioning environment. By allowing individual users access to install and manage provisioning actions for machines they own, the needs of a central administrator to perform these tasks is reduced. Also, by splitting the verification and authentication processes, each process can be implemented with different protocols.

FIG. 1 illustrates an overall provisioning environment 100, in systems and methods for the execution, management, and monitoring of software provisioning, according to exemplary aspects of the present disclosure. Embodiments described herein can be implemented in or supported by the exemplary environment illustrated in FIG. 1. The provisioning environment 100 provides a unified provisioning environment, which comprehensively manages the tasks related to software provisioning.

In particular, the provisioning environment 100 can manage software provisioning using a hierarchy of commands. In exemplary embodiments, the hierarchy can include at least four levels of commands. The lowest level in the hierarchy can comprise distribution commands, which primarily handle base operating system specific tasks of provisioning. The second level can comprise profile commands, which associate a configuration file, such as a kickstart file for Linux or other operating system, with a distribution and optionally allow for customization. The third level comprises system commands, which associate remote systems that are involved with the provisioning of the software. The fourth level comprises repository commands, which address configurations and tasks related to updating the software, remote installation procedures, and optionally customizing the software.

The provisioning environment 100 provides several capabilities and advantages over the known provisioning solutions. For example, the present invention is capable of handling a variety of forms of installations, such as preboot execution environment ("PXE"), virtualization, re-installations, and image installations.

In exemplary aspects, the provisioning environment 100 enables integrating virtualization into a PXE provisioning infrastructure and provides several options to reinstall running machines as well. The provisioning environment 100 can integrate mirroring of package repositories with the provisioning process, so that a provisioning server may serve as a central mirror point of contact for all of an organization's software needs. In aspects, a set of remote mirrored repositories can automatically be used by provisioned systems without additional setup.

Reference will now be made in detail to the exemplary aspects the provisioning environment 100. The provisioning environment 100 can be applied to provisioning any form of software, such as Windows systems, UNIX systems, and Linux systems. In the exemplary description that follows, FIG. 1 is presented to explain the provisioning environment 100 for provisioning software, such as Linux, and Linux based software, such as Fedora and Red Hat Enterprise Linux by Red Hat, Inc.

In provisioning of software such as Linux, many system administrators use what is known as the "kickstart" installation method. Kickstart files are files that specify the intended configuration of the software being provisioned. Kickstart files can be kept on a server and can be read by individual computers during the installation. This installation method allows the use a single or relatively few standard kickstart files to install Linux on multiple machines, making it ideal for network and system administrators.

The kickstart file can be a simple text file, containing a list of items, each identified by a keyword. In general, a kickstart file can be edited with any text editor or word processor that can save files as ASCII text. One skilled in the art will recognize that the present invention may be applied to non-kickstart files in software provisioning. For example, configuration files such as AutoYAST Answer files used in Novell SuSe Linux and Sun Solaris Jumpstart files may also be used by the provisioning environment 100.

Typically, a kickstart file can be copied to the boot disk, or made available on the network. The network-based approach is most commonly used, as most kickstart installations for software provisioning, such as Linux systems, tend to be performed via a network using NFS, FTP, or HTTP on networked computers. Administrators also find it desirable that kickstart installations can be performed using a local CD-ROM, or a local hard drive.

Using kickstart files, a system administrator can create a single file containing the parameters that are needed to complete a typical software installation. For example, kickstart files specify parameters related to: language selection; mouse configuration; keyboard selection; boot loader installation; disk partitioning; network configuration; NIS, LDAP, Kerberos, Hesiod, and Samba authentication; firewall configuration; and package selection.

According to exemplary aspects illustrated in FIG. 1, the provisioning environment 100 can include a provisioning server 102, a code repository 104 which provides access to distributions 106 and 108, a set of installation templates 110, a set of exception plugins 112, a helper client 114 running on target machines 116 in a network 115, a provisioning database 120 which comprises a distribution tree list 122 and template list 124. Each of these components will now be further described.

The provisioning server (from herein referred to as a "cobbler") 102 is responsible for: serving as a extensible markup language remote procedure call (XMLRPC) handler; linking to or mirroring install distribution trees and a configuration database; hosting kickstart templates; hosting plugins, generating installation images, and the like. The cobbler server 102 can be implemented as software, such as Python code, installed on a boot server machine and provides a command line interface for configuration of the boot server. In addition, the cobbler server 102 can make itself available as a Python application programming interface (API) for use by higher level management software (not shown). The cobbler server 102 supports provisioning via PXE, image (ISO) installation, virtualization, re-provisioning. As will be described later, the last two modes are performed with the assistance of a helper client 114.

The code repository 104 is responsible for hosting distributions 106 and 108. The code repository 104 may be implemented using well known components of hardware and software. Additionally, the code repository 104 can be include one or more repositories hosting distributions. The distributions 106 and 108 can include bundles of software that is already compiled and configured. The distributions 106 and 108 may be in the form of either rpm, deb, tgz, msi, exe formats, and the like. For example, as Linux distributions, the distributions 106 and 108 are bundles of software that comprise the Linux kernel, the non-kernel parts of the operating system, and assorted other software. The distributions 106 and 108 can take a variety of forms, from fully-featured desktop and server operating systems to minimal environments.

In exemplary aspects, the installation templates 110 are any data structure or processing element that can be combined with a set of installation configurations and processed to produce a resulting configuration file, such as a kickstart file.

In exemplary aspects, exception plugins 112 is software that interacts with cobbler server 102 to customize the provisioning of software. In general, the exceptions plugins 112 are intended to address infrequent customization needs.

In exemplary aspects, the helper client (known as "koan", which stands for "kickstart-over-a-network") 114 can assist the cobbler server 102 during the provisioning processes. The koan 114 can allow for both network provisioning of new virtualized guests and destructive provisioning of any existing system. When invoked, the koan 114 can request profile information from a remote boot server that has been configured with the cobbler server 102. In some aspects, what the koan 114 does with the profile data depends on whether it was invoked with—virt or—replace-self.

In exemplary aspects, the koan 114 can enable replacing running systems as well as installing virtualized profiles. The koan 114 can also be pushed out to systems automatically from the boot server. In some aspects, the koan client 114 is also written in Python code to accommodate a variety of operating systems, machine architectures, etc.

In exemplary aspects, the network 115 can include a number of the target machines 116. The target machines 116 can represent the particular machines to which software provisioning is directed. The target machines 116 may represent a wide variety of computing devices, such as personal computers, servers, laptop computers, personal mobile devices, and the like. In some aspects, the target machines 116 can represent distributed computing environments such as cloud computing environments. Although FIG. 1 shows several of the target machines 116, the provisioning environment 100 can be capable of managing a wide range environments, such as datacenters with thousands of machines or server pools with just a few machines. Additionally, the cobbler server 102 can be connected to multiple networks 115.

In exemplary aspects, the provisioning database 120 can serve as a data storage location for holding data used by the cobler server 102. For example, as shown, the provisioning database 120 can comprise the distribution tree list 122 and the template list 124. The distribution tree list 122 can provide an inventory of the distributions 106 and 108 that are hosted or mirrored by the cobbler server 102. The template list 124 can provide an inventory of the templates 110 that are hosted by the cobbler server 102.

As noted above, the cobbler server 102 can manage provisioning using a hierarchical concept of distribution commands, profile commands, system commands, and repository commands. This framework enables the cobbler server 102 to abstract the differences between multiple provisioning types (installation, reinstallation, and virtualization) and allows installation of all three from a common platform. This hierarchy of commands also permits the cobbler server 102 to integrate software repositories 126 with the provisioning process, thus allowing systems to be configured as a mirror for software updates and third party content as well as distribution content.

Distributions can contain information about base operating system tasks, such as what kernel and initial ramdisk ("initrd") are used in the provisioning, along with other information, such as required kernel parameters. Profiles associate one of the distributions 106 and 108 with a kickstart file and optionally customize it further, for example, using plugins 112. Systems commands associate a hostname, IP, or MAC with a distribution and optionally customize the profile further. Repositories contain update information, such as yum mirror information that the cobbler server 102 uses to mirror repository 104. The cobbler server 102 can also manage (generate) DHCP configuration files using the templates 110.

In exemplary aspects, the cobbler server 102 can use a provisioning environment that is fully templated, allowing for kickstarts and PXE files to be customized by the user. The cobbler server 102 uses the concept of "profiles" as an intermediate step between the operating system and the installed system. A profile is a description of what a system does rather than the software to be installed. For instance, a profile might describe a virtual web server with X amount of RAM, Y amounts of disk space, running a Linux distribution Z, and with an answer file W.

In exemplary aspects, the cobbler server 102 can provide a command line interface to configure a boot server in which it is installed. For example, the format of the cobbler server 102 commands can be generally in the format of: cobbler command [subcommand][–arg132][–arg2=]. Thus, a user can specify various aspects of software provisioning via a single interface, such as a command line interface or other known interface. Examples of exemplary cobbler commands can be found in U.S. patent application Ser. No. 11/763,315, U.S. Patent Application Publication No. 2008/0288938 and U.S. patent application Ser. No. 11/763,333, U.S. Patent Publication No. 2008/0288939, the disclosures of which are incorporated herein, in their entirety, by reference.

According to exemplary aspects, a user can use various commands of the provisioning environment 100 to specify distributions and install trees hosted by the code repository 104, such as a distribution from the distributions 106 or 108. A user can add or import a distribution or import it from installation media or an external network location.

According to exemplary aspects, in order to import a distribution, the cobbler server 102 can auto-add distributions and profiles from remote sources, whether his is an installation media (such as a DVD), an NFS path, or an rsync mirror. When importing a rsync mirror, the cobbler server 102 can try to detect the distribution type and automatically assign kickstarts. By default in some embodiments, the cobbler server can provision by erasing the hard drive, setting up eth0 for DHCP, and using a default password. If this is undesirable, an administrator may edit the kickstart files in /etc/cobbler to do something else or change the kickstart setting after the cobbler server 102 creates the profile.

According to exemplary aspects, a user may map profiles to the distributions and map systems to the profiles using profile commands and systems commands of the provisioning environment 100. A profile associates a distribution to additional specialized options, such as a kickstart automation file. In the cobbler server 102, profiles are the unit of provisioning and at least one profile exists for every distribution to be provisioned. A profile might represent, for instance, a web server or desktop configuration.

According to exemplary aspects, a user can map systems to profiles using system commands. Systems commands can assign a piece of hardware with cobbler server 102 to a profile. Systems can be defined by hostname, Internet Protocol (IP) address, or MAC address. When available, use of the MAC address to assign systems can be preferred.

According to exemplary aspects, the user can map repositories and profiles using repository commands. Repository commands can address configurations and tasks related to updating the software, remote installation procedures, and optionally customizing the software. These repository commands can also specify mirroring of the provisioned software to remote servers. Repository mirroring can allow the cobbler server 102 to mirror not only install the trees 106 and 108, but also optional packages, third party content, and updates. Mirroring can be useful for faster, more up-to-date installations and faster updates, or providing software on restricted networks. The cobbler server 102 can also include other administrative features, such as allowing the user to view their provisioning configuration or information tracking the status of a requested software installation.

According to exemplary aspects, a user can utilize commands to create a provisioning infrastructure from a distribution mirror. Then a default PXE configuration is created, so that by default systems will PXE boot into a fully automated install process for that distribution. The distribution mirror can be a network rsync mirror or a mounted DVD location.

According to exemplary aspects, the administrator uses a local kernel and initrd file (already downloaded), and shows how profiles would be created using two different kickstarts—one for a web server configuration and one for a database server. Then, a machine can be assigned to each profile.

According to exemplary aspects, a repo mirror can be set up for two repositories, and create a profile that will auto install those repository configurations on provisioned systems using that profile.

According to exemplary aspects, in addition to normal provisioning, the cobbler server 102 can support yet another option, called "enchant". Enchant takes a configuration that has already been defined and applies it to a remote system that might not have the remote helper program installed. Users might want to use this command to replace a server that is being repurposed, or when no PXE environment can be created. Thus, the enchant option allows the remote the koan client 114 to be executed remotely from the cobbler server 102.

According to aspects, if the cobbler server 102 is configured to mirror certain repositories, the cobbler server 102 can then be used to associate profiles with those repositories. Systems installed under those profiles can be auto configured to use these repository mirrors in commands and, if supported, these repositories can be leveraged. This can be useful for a large install base, fast installation and upgrades for systems are desired, or software not in a standard repository exists and provisioned systems are desired to know about that repository.

According to exemplary aspects, the cobbler server 102 may also keep track of the status of kickstarting machines. For example, the "cobbler status" will show when the cobbler server 102 thinks a machine started kickstarting and when it last requested a file. This can be a desirable way to track machines that may have gone inactive during kickstarts. The cobbler server 102 can also make a special request in the post section of the kickstart to signal when a machine is finished kickstarting.

According to exemplary aspects, for certain commands, the cobbler server 102 will create new virtualized guests on a machine in accordance to the orders from the cobbler server 102. Once finished, an administrator may use additional commands on the guest or other operations. The cobbler server 102 can automatically name domains based on their MAC addresses. For re-kickstarting, the cobbler server 102 can reprovision the system, deleting any current data and replacing it with the results of a network install.

According to exemplary aspects, the cobbler server 102 can configure boot methods for the provisioning requested by the user. For example, the cobbler server 102 can configure a PXE environment, such as a network card BIOS. Alternatively, the cobbler server 102 can compile and configure information for koan client 104. The cobbler server 102 can also optionally configured DHCP and DNS configuration information.

According to exemplary aspects, the cobbler server 102 can serve the request of the koan client 114. The koan client 114 can acknowledge the service of information of the cobbler server 102 and then can initiate installation of the software being provisioned. Additionally, the koan client 114 can either install the requested software, e.g., replace the existing operating system, or install a virtual machine.

Figure 2:
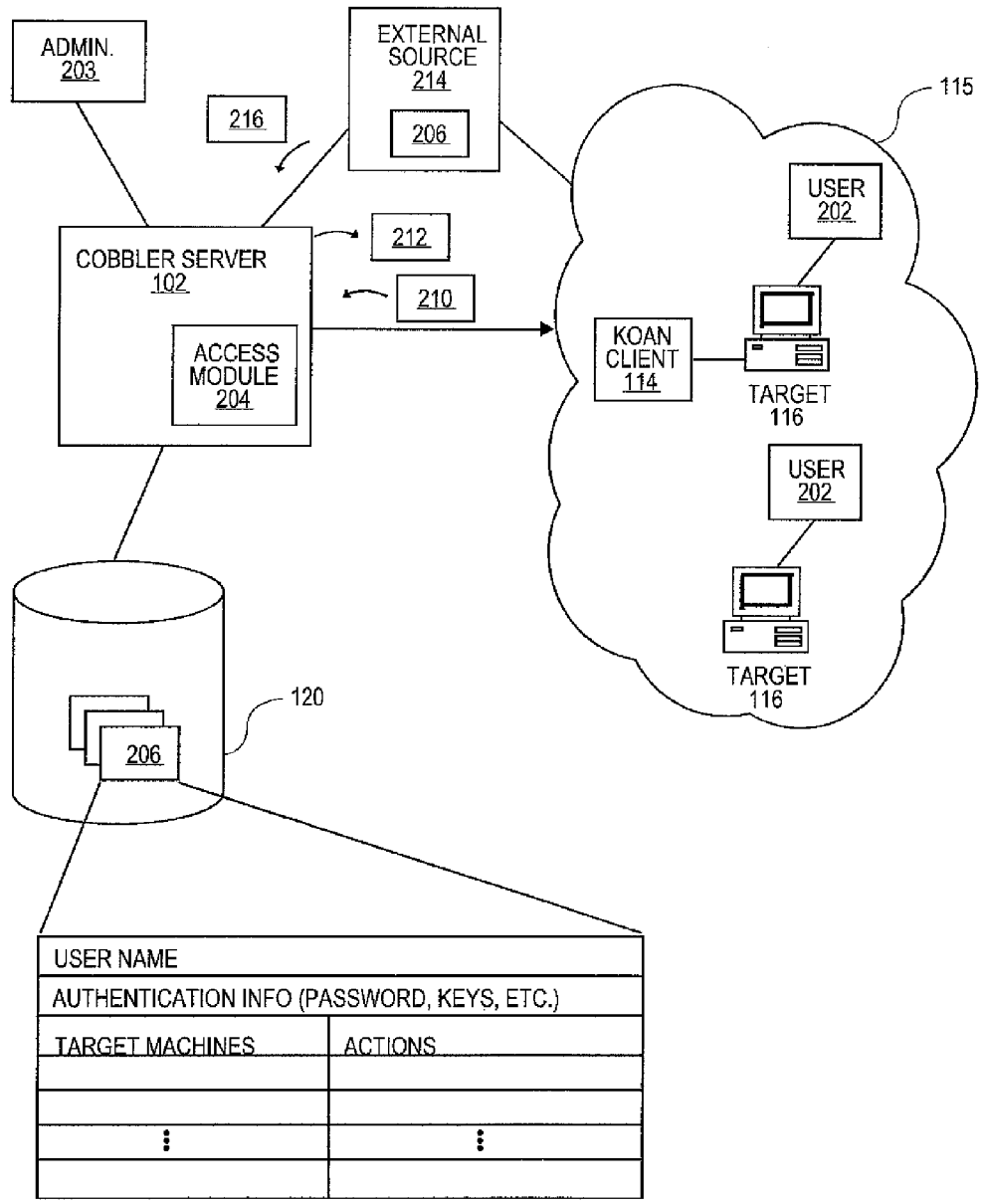
FIG. 2 illustrates the overall provisioning environment in which a provisioning server can provide different access levels for software provisioning for different users, according to various embodiments.

FIG. 2 illustrates aspects of the provisioning environment 100 that allows for access control in the cobbler server 102, according to various embodiments. In embodiments as shown, the cobbler server 102 can assign different access levels to users to provide the access control.

In embodiments, to provide access in the provisioning environment 100, the cobbler server 102 can be configured to associate user actions with users, for example users 202 or administrator 203, that have access to perform the associated user actions. The user actions can include any user action performed within or by the cobbler server 102, such as configuring the cobbler server 102, modifying or creating provisioning objects in the cobbler server 102, accessing provisioning processes by the cobbler server 102, and the like.

In embodiments, the provisioning objects can include all the data required by a cobbler server 102 to perform the software provisioning processes, such as the process described above, supported by the cobbler server. For example, the provisioning objects can include software distributions; configuration templates (templates for generating configuration files, such as kickstart files); distribution profile information (mapping a distribution to profile; a configuration template or a configuration file, and additional preferences, such as kernel options, template variables, or virtual machine settings); target machine information (information representing the mapping of a physical piece of hardware, plus hardware specific customizations, to a profile that it should run); repos information (information representing external or internal software repositories stored on the cobbler server 102); images (such as distributions representing an undefined executable image (like "memtest"); a virtual machine to be cloned, or an ISO file for use in installing a virtual machine); and the like.

In embodiments, the cobbler server 102 can be configured to include an access module 204. The access module 204 can be configured to assign different levels of access to users in the software provisioning environment 100. In particular, the access module 204 can be configured to associate the users with the user actions available to the users. The association can be based on the identity of the users or a type of user (administrator, client, guest, etc.) For example, administrator 203 can be associated with all user actions for the cobbler server 102 whereas users 202 can be associated with actions related to target machines 116 (installing, re-installing, configuring profiles for the target machines 116, virtualization, etc.). The cobbler server 102 can be configured to associate the users independently or under the direction or assistance of the administrator 203 or users 202.

In embodiments, the cobbler server 102 can be configured to receive a request, such as request 210, for a user action. The request 210 can include information such as identity of the requesting user, authentication information, and user action requested. Once a request is received for a particular user action, the cobbler server 102 can be configured to enable the requested action if the requested action is associated with the requesting user. In particular, the cobbler server 102 can be configured to verify that the requesting user has access to the particular user action. The access module 204 can be configured to perform the verification.

For example, in an exemplary embodiment, the access module 204 can be configured to associate target machines 116 with particular users 202. As such, the users 202 can request user actions (e.g. software provisioning process, modify profiles, etc.) for target machines 116 with which they are associated. Additionally, the access module 204 can be configured to associate a set of software distributions, a set of templates, and/or a set of profiles with the particular users 202. As such, the users 202 can request software provisioning processes for the associated set of software distributions, associated set of templates, and/or associated set of profiles on the target machines 116 with which they are also associated. As such, the cobbler server 102 can provide ownership to various target machines and software distribution, templates and profiles.

In embodiments, the cobbler server 102 can be configured to authenticate the identity of the requesting user. In particular, the access module 204 can be configured to authenticate the user identity to ensure that the requesting user is authentic. For example, once the request 210 is received, the provisioning server can authenticate the requesting user 202. In particular, the access module 204 can authenticate the requesting user 202 based on the authentication information available to the cobbler server 102 and the information in the request 210. The access module 204 can be configured to authenticate the user 202 using any type of security or cryptographic method such as password checks, digital signatures, digital certificates, digest files and the like. For example, the access module 204 can be configured to use well-known protocols such as Kerberos, lightweight directory assistance protocol (LDAP) and the like. Additionally, the access module 204 can be configured to use any type of user-developed or proprietary protocol.

In embodiments, the access module 204 can be implemented as a portion of the code for the cobbler server 102. Likewise, the access module 204 can be implemented as a separate software tool accessible by the cobbler server 102. The access module 204 can be written in a variety of programming languages, such as JAVA, C++, Python code, and the like to accommodate a variety of operating systems, machine architectures, etc. Additionally, the access module 204 can be configured to include the appropriate application programming interfaces ("APIs") to communicate with and cooperate with other components of the cobbler server 102 and to communicate with an external source 214, the koan clients 114, target machines 116 and users 202.

In embodiments, to verify the users and authenticate the users, the cobbler server 102 can be configured to maintain a user record 206 for each user that can request user actions. For verification, the record 206 can include identity information for the user (user name, login name, type of user, etc.), the target machines 116 associated with the user (machine identification, network information, etc.), and user actions associated with the user 202. For authentication, the records 206 can also include authentication information for the user 202 (password, digital certificate, encryption/decryption keys, etc.). The cobbler server 102 can be configured to maintain the record 206 for each user in a repository, such as database 120.

In embodiments, to receive requests 210 and register the users, the cobbler server 102 can be configured to provide a network user interface 212 to the users. The network user interface 212 can be configured to allow the user to enter identity information, authentication information, target machines, and request user action. For example, the cobbler server 102 can be configured to generate and provide a web-based network user interface using formats or combination of formats such as hypertext markup language (HTML), extensible markup language (XML), Javascript, and the like.

Additionally, in embodiments, the verification and/or the authentication processes can be performed by the external source 214. The external source 214 can be any type of application, software module, or computer system configured to perform the verification and/or authentication described above. As such, the external source 214 can be configured to authenticate the users using any type of security or cryptographic method such as password checks, digital signatures, digital certificates, digest files and the like. For example, the external source 214 can be configured to use well-known protocols such as Kerberos, lightweight directory assistance protocol (LDAP) and the like. Additionally, the external source 214 can be configured to use any type of user-developed or proprietary protocol.

The external source 214 can be written in a variety of programming languages, such as JAVA, C++, Python code, and the like to accommodate a variety of operating systems, machine architectures, etc. Additionally, the external source 214 can be configured to include the appropriate application programming interfaces ("APIs") to communicate with and cooperate with other components of the cobbler server 102 and to communicate with the koan clients 114, target machines 116 and users 202.

In embodiments, for verification and/or authentication by the external source 214 when a user transmits a request 210 for a user action, the request 210 can be received by the external source 214, or the cobbler server 102 can pass the request 210 to the external source 214 for verification and/or authentication. In response, the external source 214 can be configured to send a message 216 back to the cobbler server 102. The message 216 include an indication that the user is verified and/or authenticated to access the requested action. As such, the cobbler server 102 can enable the action based on the message 216.

Additionally, in embodiments, the external source 214 can maintain all or a portion of the user records 206 to provide the verification and/or authentication processes. For example, if performing only authentication, the external source 214 can maintain the authentication information for the user and the cobbler server 102 can maintain the verification information (user identities and associated user action).

Figure 3:
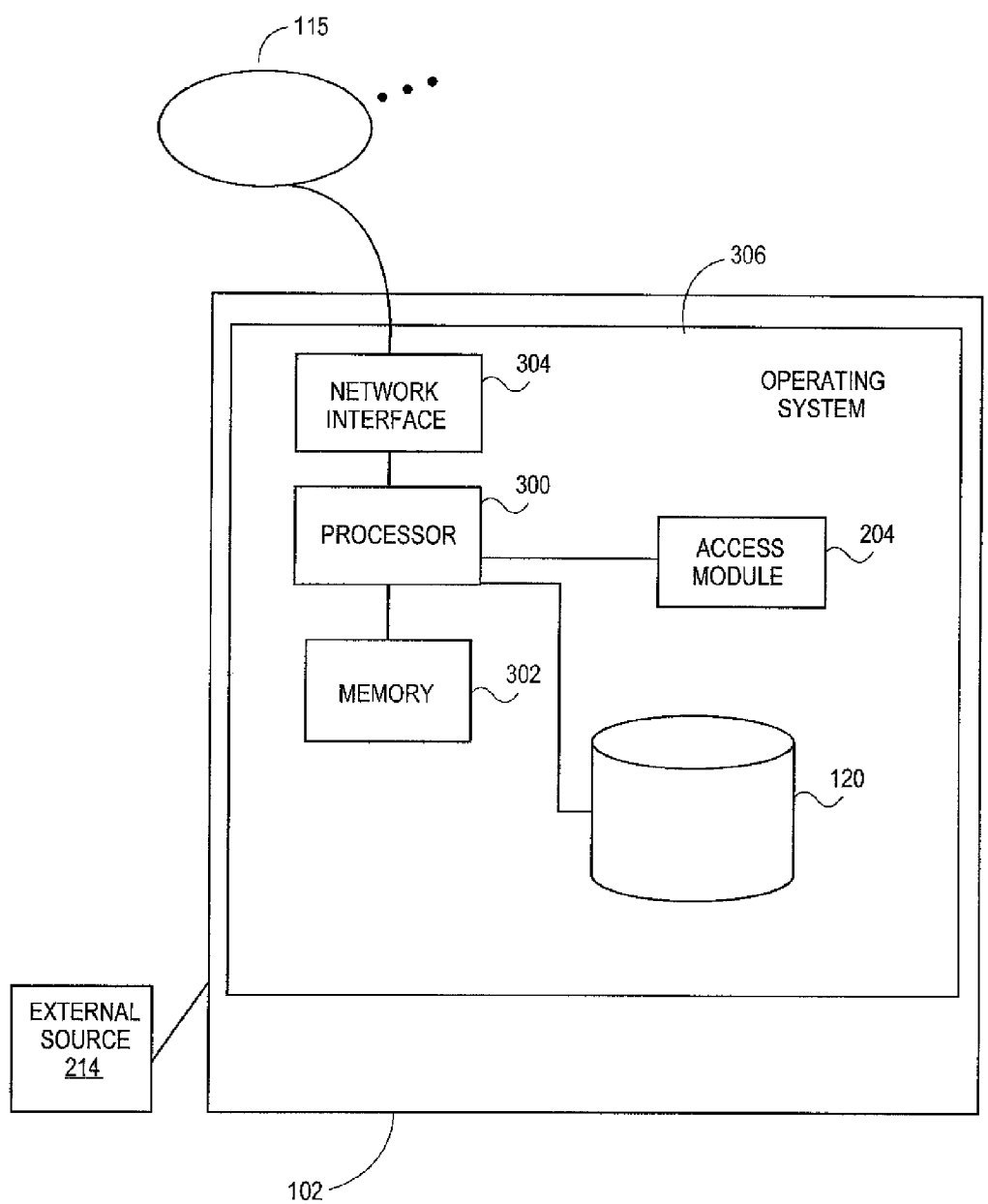
FIG. 3 illustrates an exemplary hardware configuration for a provisioning server, according to various embodiments.

FIG. 3 illustrates an exemplary diagram of hardware and other resources that can be incorporated in the cobbler server 102 configured to communicate with the network 115 and the target machines 116 in network 115, according to embodiments. In embodiments as shown, the cobbler server 102 can comprise a processor 300 communicating with memory 302, such as electronic random access memory, operating under control of or in conjunction with operating system 306. Operating system 306 can be, for example, a distribution of the Linux™ operating system, the Unix™ operating system, or other open-source or proprietary operating system or platform. Processor 300 also communicates with the provisioning database 120, such as a database stored on a local hard drive. While illustrated as a local database in the cobbler server 102, the provisioning database 120 can be separate from the cobbler server 102 and the cobbler server 102 can be configured to communicate with the remote provisioning database 120.

Processor 300 further communicates with network interface 304, such as an Ethernet or wireless data connection, which in turn communicates with one or more networks 115, such as the Internet or other public or private networks. Processor 300 also communicates with the provisioning database 120, the access module 202, to execute control logic and perform the software provisioning processes and access control described above. Additionally, the processor 300 can communicate with the external source 214 to perform the software provisioning processes and access control described above. Other configurations of the cobbler server 102, associated network connections, and other hardware and software resources are possible.

While FIG. 3 illustrates the cobbler server 102 as a standalone system comprising a combination of hardware and software, the cobbler server 102 can also be implemented as a software application or program capable of being executed by a convention computer platform. Likewise, the cobbler server 102 can also be implemented as a software module or program module capable of being incorporated in other software applications and programs. In either case, the cobbler server 102 can be implemented in any type of conventional proprietary or open-source computer language.

Figure 4:
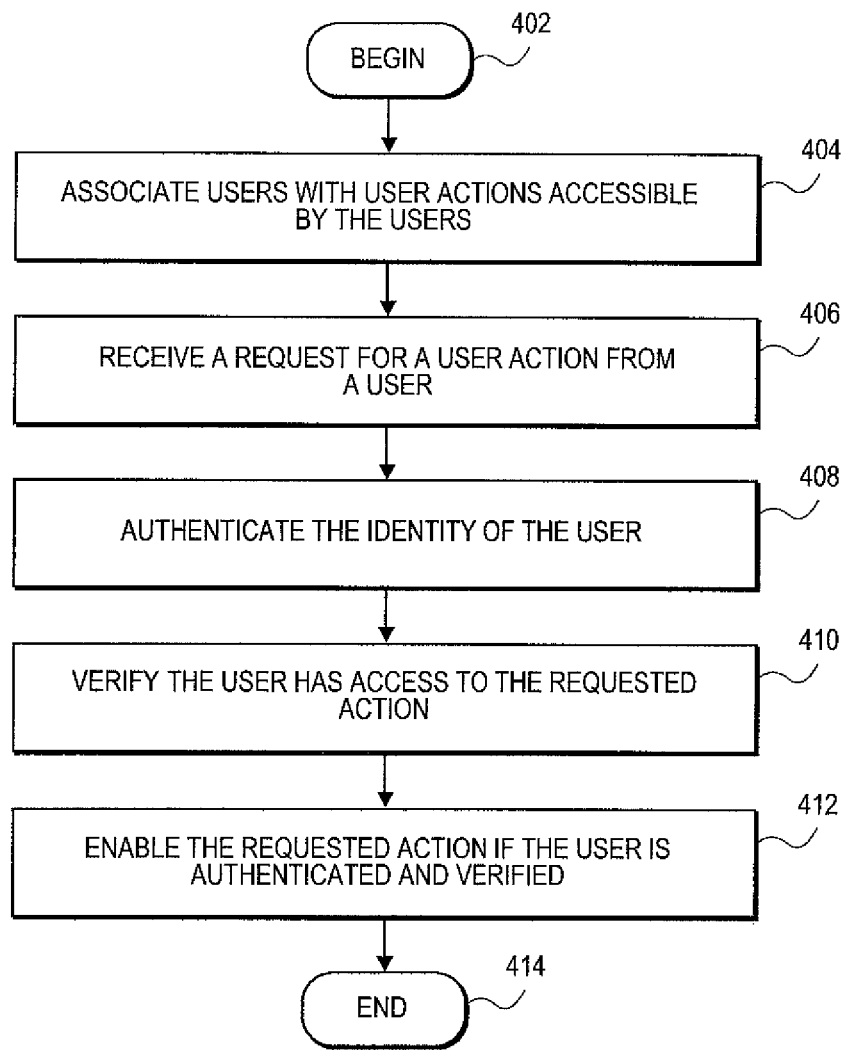
FIG. 4 illustrates a flowchart for providing access to a software provisioning environment, according to various embodiments.

FIG. 4 illustrates a flow diagram of overall access control processes in the provisioning environment 100, according to embodiments of the present teachings. In 402, the process can begin. In 404, the cobbler server 102 can associate users with user actions accessible by the users. The user actions can include any user action performed within or by the provisioning server, such as configuring the provisioning server, modifying or creating provisioning objects in the provisioning server, accessing provisioning processes by the provisioning server, and the like.

In 406, the cobbler server 102 can receive a request 210 for a user action from a user. The request 210 can include the identity information of the user, the authentication information of the user, and the user action requested. Alternatively, the external source 214 can receive the request 210 from the user or from the cobbler server 102.

Then, in 408, the cobbler server 102 or the external source 214 can authenticate the identity of the user. For example, the access module 204 can compare the authentication information provided to the authentication information contained in the record 206. Alternatively, the external source 214 can compare the authentication information provided to the authentication information contained in the record 206, and the external source 214 can provide an indication of the authenticity in a message 216.

Once authenticated, in 410, the cobbler server 102 or the external source 214 can verify the user has access to the requested action. For example, the access module 204 can check the record 206 to determine if the requesting user has access to the requested action. Alternative, the external source 214 can check the record 206 to determine if the requesting user has access to the requested action, and the external source 214 can provide an indication of the verification in the message 216.

Then, in 412, if the requesting user is authenticated and verified, the cobbler server 102 can enable the requested action. In 414, the process can end, but the process can return to any point and repeat.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as Limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:

assigning, by a processor, each user of a set of users to a set of user actions available to be performed by the user, wherein the set of user actions comprises at least one of configuring a provisioning server, modifying a provisioning object in the provisioning server, creating a provisioning object in the provisioning server, or accessing a provisioning process by the provisioning server, and wherein each user of the set of users is granted access limited to the assigned set of user actions available to be performed by the user;

maintaining a plurality of user-specific records each comprising information identifying a user, a target machine associated with the user, and the set of user actions assigned to the user, wherein the information identifying the user comprises a user name and authentication key associated with the user;

receiving, by the processor, a request from a first user to perform a selected user action related to a software provisioning environment;

verifying that the selected user action is available to be performed by the first user in view of a user-specific record associated with the first user; and enabling, by the processor, the selected user action when the first user is assigned the selected user action.

2. The method of claim 1, further comprising:

providing a network user interface to receive the request.

3. The method of claim 1, wherein assigning each user to the set of user actions available to be performed by the user, comprises:

assigning, by the processor, each user with the set of user actions available to be performed by the user in view of at least one of the identity of each user or a type of each user.

4. The method of claim 1, further comprising:

authenticating, by the processor, an identity received from the first user.

5. A system comprising:

a memory to store instructions: and a processor operatively coupled to the memory, the processor to execute the instructions to:

assign each user of the set of users with a set of user actions available to be performed by the user, wherein the set of user actions comprises at least one of configuring a provisioning server, modifying a provisioning object in the provisioning server, creating a provisioning object in the provisioning server, or accessing a provisioning process by the provisioning server, and wherein each user of the set of users is granted access limited to the associated set of user actions available to be performed by the user;

maintain a plurality of user-specific records each comprising information identifying a user, a target machine associated with the user, and the set of user actions assigned to the user, wherein the information identifying the user comprises a user name and authentication key associated with the user;

receive a request from a first user to perform a selected user action related to a software provisioning environment;

verify that the selected user action is available to be performed by the first user in view of a user-specific record associated with the first user; and enable the selected user action when the user is assigned the selected user action.

6. The system of claim 5, the processor to:
provide a network user interface to receive the request.

7. The system of claim 5, wherein to associate each user with the set of user actions, the processor is to:
associate each user with the set of user actions available to be performed by the user in view of at least one of the identity of each user or a type of each user.

8. The system of claim 5, the processor to:
authenticate an identity received from the first user.

9. A non-transitory computer readable medium comprising instructions that, when executed by a processor, cause the processor to:
assign, by the processor, each user of the set of users with a set of user actions available to be performed by the user, wherein the set of user actions comprises at least one of configuring a provisioning server, modifying a provisioning object in the provisioning server, creating a provisioning object in the provisioning server, or accessing a provisioning process by the provisioning server, and wherein each user of the set of users is granted access limited to the associated set of user actions available to be performed by the user;

maintain a plurality of user-specific records each comprising information identifying a user, a target machine associated with the user, and the set of user actions assigned to the user, wherein the information identifying the user comprises a user name and authentication key associated with the user;

receive a request from a first user to perform a selected user action related to a software provisioning environment;

verify that the selected user action is available to be performed by the first user in view of a user-specific record associated with the first user; and enable the selected user action when the user is assigned the selected user action.

10. The non-transitory computer readable medium of claim 9, the processor to provide a network user interface to receive the request.

11. The non-transitory computer readable medium of claim 9, the processor to:
assign each user to the set of user actions available to be performed by the user in view of at least one of the identity of each user or a type of each user.

12. The non-transitory computer readable medium of claim 9, the processor to:
authenticate an identity received from the first user.

\* \* \* \* \*